United States Patent
Kogita et al.

[11] Patent Number: 5,980,047
[45] Date of Patent: Nov. 9, 1999

[54] REAR UNDER VIEW MIRROR APPARATUS FOR AUTOMOBILES

[75] Inventors: Hidekazu Kogita; Nobuhiro Yamauchi, both of Kariya, Japan

[73] Assignee: Aisin Seiki Kabushiki Kaisha, Kariya, Japan

[21] Appl. No.: 08/917,518

[22] Filed: Aug. 26, 1997

[30] Foreign Application Priority Data

Aug. 26, 1996 [JP] Japan ................................ 8-240979

[51] Int. Cl.⁶ .............................. G02B 5/08; G02B 7/18
[52] U.S. Cl. ........................ 359/841; 359/843; 359/875; 248/281.11
[58] Field of Search ..................... 359/841, 843, 359/872, 875; 248/281.11, 286.11, 287.1

[56] References Cited

U.S. PATENT DOCUMENTS 4,469,405  9/1984  Chin-Wun ........................... 359/841
4,907,937  3/1990  Milenkovic ........................... 414/735
5,537,190  7/1996  Kogita et al. ........................ 359/877

FOREIGN PATENT DOCUMENTS 1-127430  5/1989  Japan.

*Primary Examiner*—Cassandra Spyrou
*Assistant Examiner*—Mark A. Robinson
*Attorney, Agent, or Firm*—Burns, Doane, Swecker & Mathis, LLP

[57] ABSTRACT

A driving arm (5) that is connected directly to an output shaft (4) of an electric motor (3) is connected to a mirror housing (8) through a ball joint (10). On the other hand, a driven arm (6) is connected to the mirror housing (8) through a connection device (11) having two orthogonally intersecting shafts (12, 14). The both arms (5, 6) are disposed in parallel with each other with a level difference being provided therebetween. As a result, the under view mirror is held in an attitude preferable for the stored position thereof and held in an attitude preferable for the use position thereof, when it is moved to the use position.

10 Claims, 3 Drawing Sheets

REAR UNDER VIEW MIRROR APPARATUS FOR AUTOMOBILES

BACKGROUND OF THE INVENTION

The present invention relates to a rear under view mirror apparatus for automobiles which is used to confirm from the driver's seat the safety at the under field of the rear zone of the automobile when the automobile is moved backward.

The confirmation of the safety at the rear field or area behind the automobile when the automobile is moved backward is indispensable. Especially, in the case of a box-type automobile such as a bus, wagon, etc., it is difficult to visually recognize or ensure from the driver's seat the rear under field of view. Therefore, the use of a rear under view mirror apparatus is indispensable. A typical example of such an under view mirror apparatus has a construction wherein a stay is secured on a rear portion of the roof of the automobile and a downwardly directed convex mirror is fixed to a forward end of this stay, whereby the driver sees an image of the convex mirror through a back mirror that is provided near the driver's seat so as to ensure the rear under field of view from the driver's seat.

This conventional example is of a fixed type. Therefore, the under view mirror apparatus of this conventional example cannot be stored during an ordinary running of the automobile and so is unpreferable not only from the viewpoint of the enhancement of the visual recognition of the rear field for safety but also from the viewpoint of the outer appearance.

In view of this, the general practice is that the under view mirror apparatus is ordinarily stored within a rear spoiler or deflector, namely a stored position, and, only when the automobile is to be moved backward, the under view mirror apparatus is caused to protrude from the stored position and moved to the position of use, namely, a use position. One example of this is disclosed in Japanese Patent Laid-Open Publication No. H1-127430 (1989). This conventional example is such that pulleys and belts are used in combination. However, in this conventional example, the surface of the mirror is only linearly moved from the stored position to the use position. The relative relationship between the surface of the mirror and the automobile remains unchanged. In other words, when the position of the mirror which is suitable for the visual view of the under rear field of the automobile is determined, the mirror is stored into the deflector with its attitude remaining unchanged. As a result, the contour of the housing of the mirror and the contour of the deflector are brought out of coincidence with each other, so that the outer appearance of the combined structure as a whole is not good. On the other hand, when trying to make the outer appearance good, it results that the design of the deflector is limited by a space for the housing of the mirror and so the freedom of design is limited.

SUMMARY OF THE INVENTION

Accordingly, it is an object of the present invention to eliminate the drawbacks that are inherent in the above-described conventional examples.

In order to attain the above object, according to the present invention, there is basically adopted technical means for connecting the mirror housing to a member of the rear side of the roof of an automobile through a driving arm and a driven arm whose length and configuration are different from those of the driving arm to thereby make a change the direction of the under view mirror at the stored position from the direction thereof at the use position.

Specifically, the present invention provides an under view mirror apparatus for automobile, which comprises a driving device that is supported by a bracket fixed to a member at the rear side of the roof of the automobile, a driving arm that is rockably or swingably connected at one end to the output shaft of the driving device, a driven arm that is rockably or swingably connected at one end to the bracket and is in parallel relation with the driving arm and is different in length and configuration from the driving arm, and a mirror housing that is connected to the driving arm through a universal joint and is connected to the driven arm through a connection device rockable about each of the two shafts that intersect each other at a right angle and that retains an under view mirror.

Preferably, the driving arm is shaped like a horizontally thrown V when viewed from a direction perpendicular to the plane in which it is disposed and the length thereof is larger than that of the driven arm, both the arms being disposed with a level difference being provided therebetween.

DETAILED DESCRIPTION OF THE PREFERRED EMBODIMENT

Figure 1:
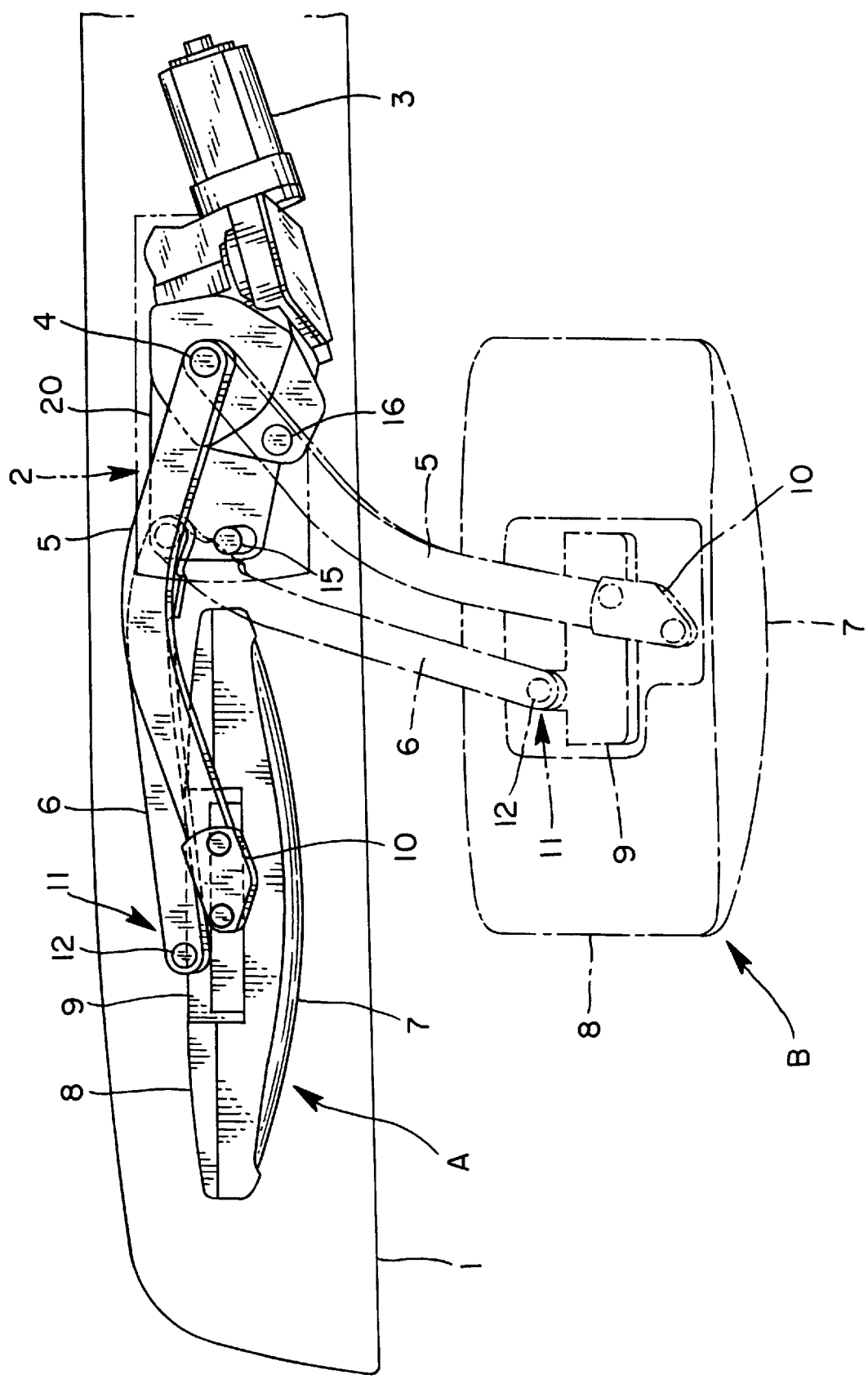
FIG. 1 is a view taken from the rear of an automobile, illustrating an embodiment of the present invention.

On a member mounted at the rear side of an automobile, e.g., a deflector 1 or rear spoiler there is mounted a bracket 2, by which there are supported an electric motor 3 and a reduction gear-equipped driving device housing 20. To an output shaft 4 of the electric motor 3 there is fixed a driving arm 5 that is shaped like a horizontally thrown V when viewed from a direction perpendicular to the plane in which it is disposed. To an end of the driving device housing 20 there is rockably fixed a driven arm 6 that is substantially linear and is shorter in length than that of the driving arm 5. Although both the arms 5 and 6 are disposed in substantially parallel relationship with each other (as viewed from the rear of the automobile—see FIG. 1), they have a level difference therebetween (as viewed from the side of the automobile—see FIG. 2). Each of the both arms 5 and 6 is rocked within a plane that is along the rear face of the automobile.

A forward or tip end of the driving arm 5 is attached through a universal joint, preferably ball joint 10 to a bracket 9 of a mirror housing 8 having an under view mirror 7. As a result, when the reversible type electric motor 3 is operated, the mirror housing 8 moves along the locus determined by the driving arm 5, which is along the rear face of the automobile.

Figure 3:
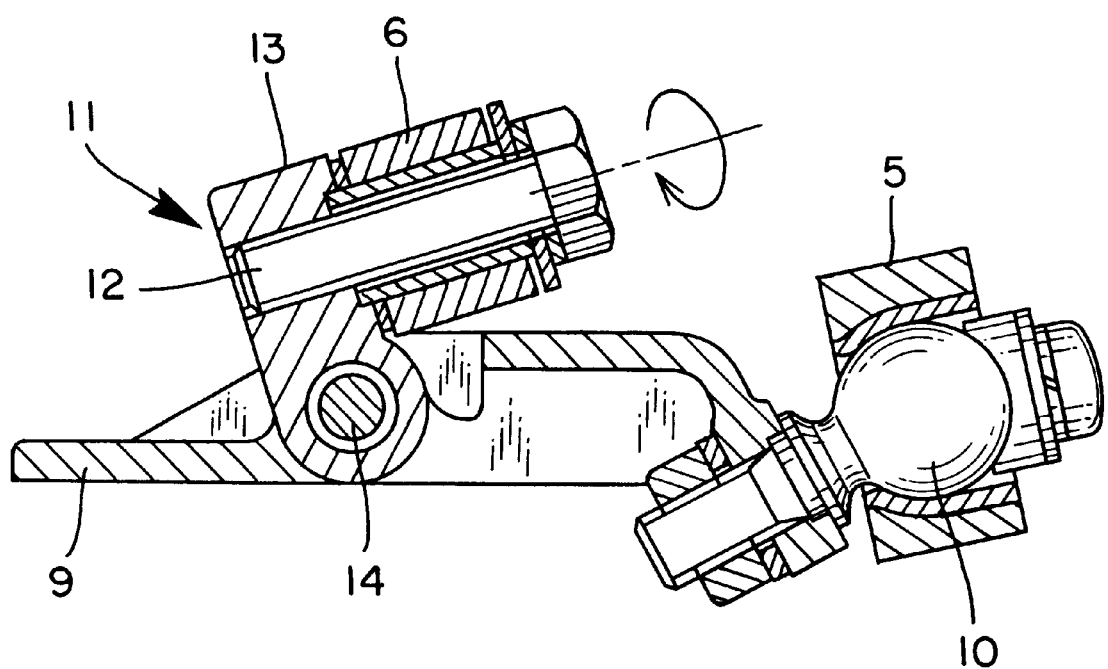
FIG. 3 is a sectional view illustrating a connection device.

A forward or tip end of the driven arm 6 is supported by the bracket 9 through a connection device 11. As illustrated in FIG. 3, the connection device 11 is composed of a bolt 12 intersecting vertically with respect to the flat plane of the driven arm 6, a hinge 13 receiving the bolt 12, and a shaft 14 for rockably attaching the hinge 13 to the bracket 9, the shaft 14 being in a relationship of intersecting the bolt 12 vertically with respect thereto. As a result, the driven arm 6 is rocked about the axis of the bolt 12 and this bolt 12 is rocked about the axis of the shaft 14 along with the hinge 13. In other words, the mirror housing 8 can thus be rocked about each of the shaft 14 and bolt 12.

As illustrated in FIG. 1, a pin 15 having a rubber ring attached thereto and extending rearwardly is secured on one end of the driving device housing 20 and is used as a first stopper 15. The first stopper 15 permits free abutment thereon of the side face of the driven arm 6 to restrict a stroke of the driven arm 6 and determines the use position of the mirror housing 8, whereby supply of the power to the electric motor 3 is stopped by abutment of the driven arm 6 against the first stopper 15.

A second stopper 16 shaped like a washer and having a cushion material equipped thereto is provided at an appropriate position of the driving device housing 20 and this stopper 16 is used to regulate the movement of the driving arm 5 toward the rear face of the automobile due to an external force.

At a stored position of the under view mirror that is indicated by an arrow A in FIGS. 1 and 2, the under view mirror 7 is directed substantially right below and the mirror housing 8 is located at a lower part of the deflector 1.

When supplying the current to the electric motor 3 for confirming the rear under field of view from the driver's seat, the driving arm 5 moves from the upper to the lower position within a flat plane that is along the rear face of the automobile in such a manner as to follow the rotation of the output shaft 4. And, the driven arm 6 also moves downward in such a manner as to follow the movement of this driving arm 5. However, since the driven arm 6 is shorter than the driving arm 5 and is connected to the mirror housing 8 through the connection device 11 with the two vertically intersecting shafts, the attitude of the mirror housing 8 is changed bit by bit with the downward movement of the driven arm 6, with the result that at the use position the under view mirror 7 is directed in an obliquely forward and downward direction. This position of use is sensed by abutment between the first stopper 15 and the driven arm 6 and stops supply of the current to the electric motor 3 after this abutment.

The external force that is applied to the mirror housing 8 located at the suspended position is resisted by the connection device 11, ball joint 10 and reduction gear. Also, an external force which causes the mirror housing 8 to be pulled downward is resisted by the second stopper 16.

Supply of the current to the electric motor 3 in the reverse direction moves the mirror housing 8 in the reverse, i.e. upward direction along the locus that has been mentioned previously to thereby move the mirror housing 8 from the use position to the stored position.

Figure 2:
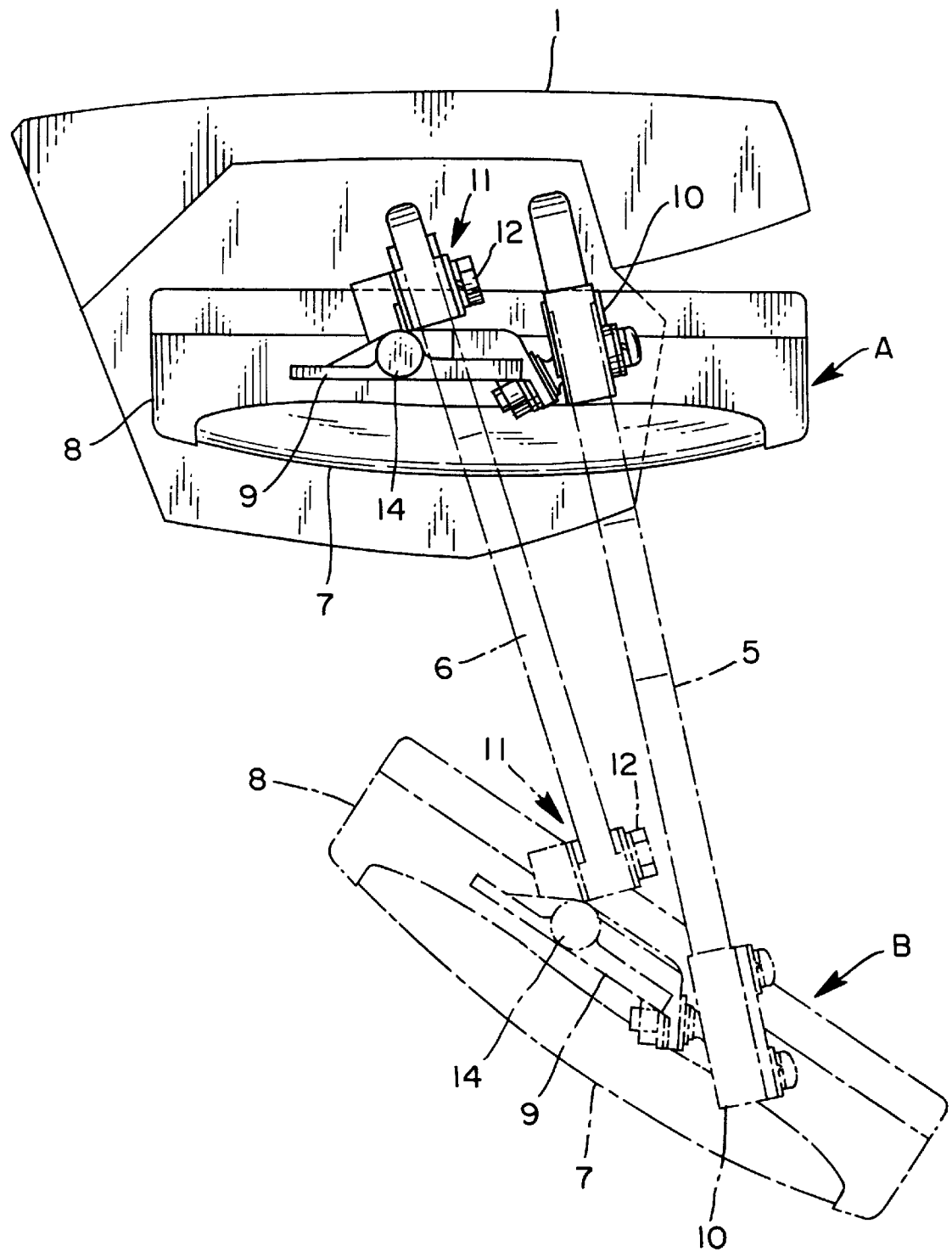
FIG. 2 is a view taken from the side thereof, illustrating the embodiment of the present invention.

As apparent from FIG. 1, when viewed from the rear of the automobile toward the front thereof, the use position of the mirror housing 8 is displaced from the stored position thereof toward the electric motor 3 side and, in addition, when viewed in FIG. 2, is displaced slightly rearwardly. That is, it is seen that the mirror housing 8 is moved three-dimensionally, i.e., is moved from the position that is located right below the deflector 1 to the preferable use position. The both arms 5 and 6 are each made into a configuration permitting such movements.

As many apparently widely embodiments of the present invention can be made without departing from the spirit and scope thereof, it is to be understood that the invention is not limited to the specific embodiments thereof except as defined in the appended claims.

What is claimed is:

1. An under view mirror apparatus for automobiles, comprising a driving device that is secured to a member at a rear side of a roof of an automobile, a driving arm that is rotatable connected at one end to an output shaft of the driving device, a driven arm that is rotatable connected at one end to the member, said driven arm being spaced away from the driving arm and possessing a length that is different from the driving arm, and a mirror housing connected to the driving arm through a universal joint and connected to the driven arm through a connection device having two shafts through which the driven arm is rotatable with respect to the mirror housing, the shafts being disposed at a right angle to each other, and the mirror housing retaining a mirror, wherein the driving arm is shaped like a horizontally thrown V when viewed from a direction perpendicular to the plane in which the driving arm is disposed, the driving arm possessing a length longer than that of the driven arm, both the driven and driving arms being disposed with a level difference being provided therebetween.

2. An under view mirror apparatus for automobiles according to claim 1, wherein the universal joint is a ball joint.

3. An under view mirror apparatus for automobiles according to claim 2, wherein the connection device includes a hinge that is fixed to a bolt forming one of said shafts, said bolt being disposed to intersect a flat plane of the driven arm at a right angle, the other of said two shafts rotatably retaining the hinge with respect to the mirror housing.

4. An under view mirror apparatus for automobiles according to claim 1, wherein the mirror housing is movable between a stored position and a use position, and including a rearwardly extending pin against which the driven arm abuts when the mirror housing is moved to the use position.

5. An under view mirror apparatus for automobiles according to claim 4, wherein the output shaft of the driving device extends rearwardly.

6. An under view mirror apparatus for automobiles, comprising a driving device that is secured to a deflector at a rear side of a roof of an automobile, a driving arm that is rotatable connected at one end to an output shaft of the driving device, a driven arm that is rotatably connected at one end to the member, said driven arm being spaced away from the driving arm and possessing a length that is different from the driving arm, and a mirror housing connected to the driving arm through a universal joint and connected to the driven arm through a connection device having two shafts through which the driven arm is rotatable with respect to the mirror housing, the shafts being disposed at a right angle to each other, and the mirror housing retaining a mirror, wherein a stored position of the mirror housing is located right below the deflector and wherein the mirror housing is movable between the stored position and a use position, at the stored position the mirror is directed downward and at the use position the mirror is directed obliquely forward and downward.

7. An under view mirror apparatus mounted rearward of an automobile so as to confirm a rear under field of view thereof from a driver's seat, comprising;

a base member adapted to be mounted rearward of an automobile, a mirror housing movably supported with respect to the base member and selectively positionable from a stored position inside the base member to a use position wherein the mirror housing transfers a rear under field of view of the automobile to a driver's seat side, and actuating means for moving the mirror housing between the stored position and the use position, the actuating means including a power source mounted on the base member, a driving arm operatively connected at one end with the power source and at the other end with the mirror housing through a universal joint so as to be reciprocable when the power source is actuated, and a driven arm connected at one end with the base member and at the other end with the mirror housing through pivotal means, the mirror housing being located right below the base member and directed downward when in the stored position, and the mirror housing being directed obliquely forward and downward when in the use position.

8. An under view mirror apparatus for automobiles according to claim 7, wherein the pivotal means includes a first bolt for securing the driven arm on a hinge member and a second bolt for securing the hinge member to the mirror housing, said first and second bolts each having an axis, the axis of the first bolt intersecting the axis of the second bolt at a right angle.

9. An under view mirror apparatus for automobiles, comprising a mirror housing that retains a mirror, a driving device secured to a member at a rear side of a roof of an automobile for providing a driving force to move the mirror housing between a stored position and a use position, a driving arm having a first end and a second end, the first end of the driving arm being connected to an output shaft of the driving device, the second end of the driving arm being connected to the mirror housing by way of a connection joint, a driven arm having a first end and a second end, the first end of the driven arm being rotatably connected to the member and the second end of the driven arm being connected to the mirror housing through a connection device which permits said mirror housing to rotate relative to the driven arm about two axes located transverse to one another as said mirror housing is moved between the stored position and the use position during operation of the driving device, wherein the driving arm possesses a length greater than that of the driven arm.

10. An under view mirror apparatus for automobiles, comprising a mirror housing that retains a mirror, a driving device secured to a deflector at a rear side of a roof of an automobile for providing a driving force to move the mirror housing between a stored position and a use position, a driving arm having a first end and a second end, the first end of the driving arm being connected to an output shaft of the driving device, the second end of the driving arm being connected to the mirror housing by way of a connection joint, a driven arm having a first end and a second end, the first end of the driven arm being rotatable connected to the member and the second end of the driven arm being connected to the mirror housing through a connection device which permits said mirror housing to rotate relative to the driven arm about two axes located transverse to one another as said mirror housing is moved between the stored position and the use position during operation of the driving device, the mirror being directed downward when the mirror housing is in the stored position and being directed obliquely forward and downward when the mirror housing is in the use position.

* * * * *